INVENTOR.
AL I. BESSONNY
BY George F. Dvorak
ATTY.

INVENTOR.
AL I. BESSONNY
BY *George F. Dorah*
ATTY.

INVENTOR.
Al I. Bessonny

3,105,405
CONTROL SYSTEM WITH ADJUSTABLE SELECTOR SWITCH MEANS FOR WEB SEVERING MACHINE
Al I. Bessonny, Evanston, Ill., assignor to Machine-O-Matic, Inc., Evanston, Ill.
Filed Sept. 21, 1959, Ser. No. 842,175
2 Claims. (Cl. 83—75)

The present invention relates to a control system for web-severing machines and has particular reference to automatic control apparatus which will enable uniform lengths of web stock to be repeatedly severed from a continuously moving ribbon or sheet of such stock.

This application is a continuation-in-part of Bessonny application Serial Number 576,310, filed April 5, 1956, now abandoned.

It more specifically relates to a device that is capable of setting the cycle of a continuous process machine through the adjustment of a single dial. This device is capable of automatically directing the indication, regulation and control of synchronization in continuous process machines.

A continuous processing machine generally performs a repeated operation upon a continuous web or ribbon stock fed therein and is exemplified by punching machines, stamping machines, printing machines, cutting machines and the like. The frequency of the operation must be correlated or synchronized with the linear speed of material fed into the machine to obtain the desired spacing of operations upon the material. It is frequently essential that a very high degree of accuracy be maintained between these two components in order to maintain precise tolerances in the linear distances between operations upon the web of stock.

In cutting machines, for example, it is sometimes necessary to maintain the length of sheets cut from a continuous web within certain close limits of length.

Heretofore, to accomplish this, a wide variety of so-called register control systems have been devised, most of them operable under the control of a photoelectric scanning device, and wherein means are provided for varying the length of the severed sheets by changing the relationship between the rate at which the web is fed to the rotary cutting knife, invariably employed in connection with such machines, and the frequency of operation of the knife upon the moving web. Certain of these machines are predicated upon maintaining the feed roll speed constant while varying the cutter speed, while other such machines maintain the cutter speed constant and vary the feed roll speed to effect the necessary change in the length of the severed sheet. In either instance however, the length of the sheets which are severed from the web is a function of the position of the photo-electric scanning device with respect to a series of fixed indicia marks which are provided on the continuously moving web at equally spaced distances therealong. Thus, the speed of the web or the speed of the knife, as the case may be, is a function of the position of the oncoming arbitrarily divided web sections yet-to-be-cut, so that neither the operator of the machine nor the automatic control mechanism of the machine itself is capable of exerting any control over the length of the sheets being cut, other than that which is dictated by the spacing of the fixed reference indicia on the sheet. If for any reason, as for example, a sluggish relay, or a thermionic defect occurs in the system, the consequent displacement in the point of cut in relation to the fixed indicia on the web will continue to prevail and no corrective control can be exerted. Furthermore, a machine that is dependent upon fixed reference indicia upon the web obviously requires that the web be pre-printed, pre-punched, pre-stamped or otherwise preliminarily treated, thereby adding to the overall cost of the operation. Finally, machines of the type briefly outlined above are not readily susceptible to change-over operations wherein the sheets to be severed for one given run of sheets differ in length from the sheets to be severed for another run. Where such change-over operations are contemplated, it usually is necessary to effect various machine adjustments, including a change in the distance which the scanning device assumes relative to the cutter. These change-over operations frequently are tedious and require preliminary testing before the machine can be set into full scale operation.

The present invention is designed to overcome the above-noted limitations that are attendant upon the construction and use of conventional web severing machines and, toward this end, it contemplates the provision of a control system which will enable a machine to function independently of any fixed reference indicia so that no such indicia need be applied to the web, and which will control the length of the individual severed sheets solely by the character of the length of the cuts which have been effected upon the previously severed sheets. Thus, if at any time there is a tendency for the machine to sever sheets which are longer than the desired sheet length, the machine, sensing this so to speak, will operate to automatically reduce the length of the cut which is performed upon the succeeding sheets severed from the web. Conversely, the machine will operate to increase the length of the sheets which are severed after it has been ascertained that a given preceding cut is shorter than the desired length of cut.

In carrying out the present invention, the continuous web is fed to the usual rotary cutter from a pair of feed rolls at a feeding station. The sheet passes through the severing station at which the cutter is disposed, and extends to a sensing station where the position of the leading edge of the sheet is sensed by a scanning device, thus in effect measuring the exact length of the sheet. At this point, the cutter operates to sever the sheet at the severing station and, if the sheet has been measured to conform to the desired length, the machine continues to operate uninterruptedly and unchanged. However, if the sheet is not of the correct predetermined length, a signal is emitted which, in one illustrated and semi-automatic form of the invention, indicates to the operator that the knife speed is either too fast or too slow, thereby enabling the operator, by merely changing the position of a dial, to correct the knife speed. In another and fully automatic form of the invention, the signal which is emitted by the photo-electric scanning device serves to effect the necessary correction in the speed of the cutter to bring the length of succeeding sheets back to the desired length.

According to the persent invention, since control of cutter speed, or of web speed, may be effected simply by the setting of a dial, an operator who is familiar with the calibration of such dial and with the formulae necessary for its control, may, by setting such dial prior to operation of the machine, predetermine the length of the sheets which will be severed from the web, after which the machine will operate automatically, either to signal when and in which direction such length has been deviated from, or to adjust the machine for proper length severing operations.

The provision of a control system of the character briefly outlined above being among the principal objects of the invention, other objects and advantages will readily suggest themselves as the following description ensues.

In the accompanying five sheets of drawings forming a part of this specification, two illustrative embodiments of the invention have been shown.

Figure 1:
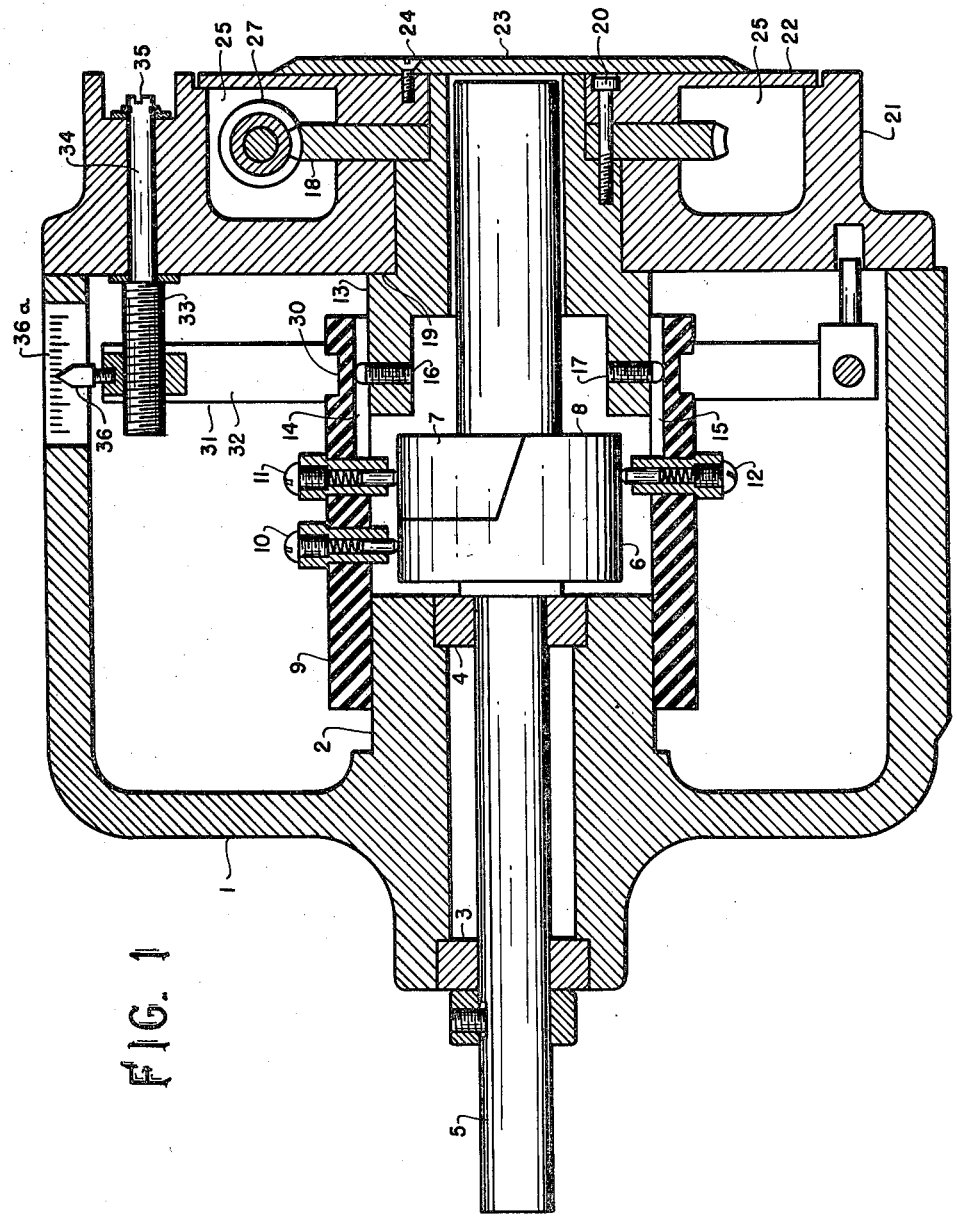
FIG. 1 is a sectional view taken substantially centrally and longitudinally through a detector switch constructed in accordance with the principles of the present invention and employed in connection with the present control system.

The selector switch includes a housing 1, having an integral journal box 2 adapted to retain two bearing members 3 and 4. A shaft 5 is rotatably supported by bearing members 3 and 4 within the housing 1. The shaft 5 carries a rotor 6 medially of its ends. The rotor 6 is comprised of two parts, namely an insulating part 7 and a conducting part 8, the latter part constituting a bridging contact for a pair of brushes as will be described presently. The interlineation between the two parts 7 and 8 includes portions which lie in a plane that intersects the longitudinal axis of the shaft 5 at a small angle.

Brush yoke or support member 9 is made of insulating material and is mounted about the journal section 2 of housing 1 in a manner as to permit a certain degree of rotational movement, as well as axial movement. Brush yoke 9 supports three brushes 10, 11 and 12. Brush 10 is so positioned along the longitudinal axis of shaft 5 as to be in continuous contact with that portion of the rotor 6 which is not split. Hence, this brush is in electrical contact with the bridging contact 8 for any position of rotation of the shaft 5.

Brushes 11 and 12 are mounted on the brush yoke diametrically opposite to each other, and are so disposed with regard to the control section of the shaft 5 that for the greatest part of the rotation of the shaft 5, they are not electrically interconnected with each other, one brush contacting conducting surface 8 while the other contacts insulating part 7. At two angular positions of each complete rotation of the shaft 5, brushes 11 and 12 become electrically interconnected through the bridging contact 8. In these two positions, brushes 10, 11 and 12 are all interconnected electrically. At any other positions of rotation, brush 10 is connected either to brush 11 or brush 12, but not to both.

One end of brush yoke 9 is telescopically engaged with collar member 13 and non-rotatably connected thereto. Longitudinal slots 14 and 15 on the inside periphery of brush yoke 9 permit set screws 16 and 17 which are threadedly engaged in collar member 13 to establish a sliding pilot connection so that the brush yoke is permitted to move axially with respect to the collar member 13 to a certain extent.

A pinion 18 is fitted on a reduced diameter section of collar member 13, being seated against shoulder 19 thereof and non-rotatably secured thereto by means of a screw 20.

Figure 2:
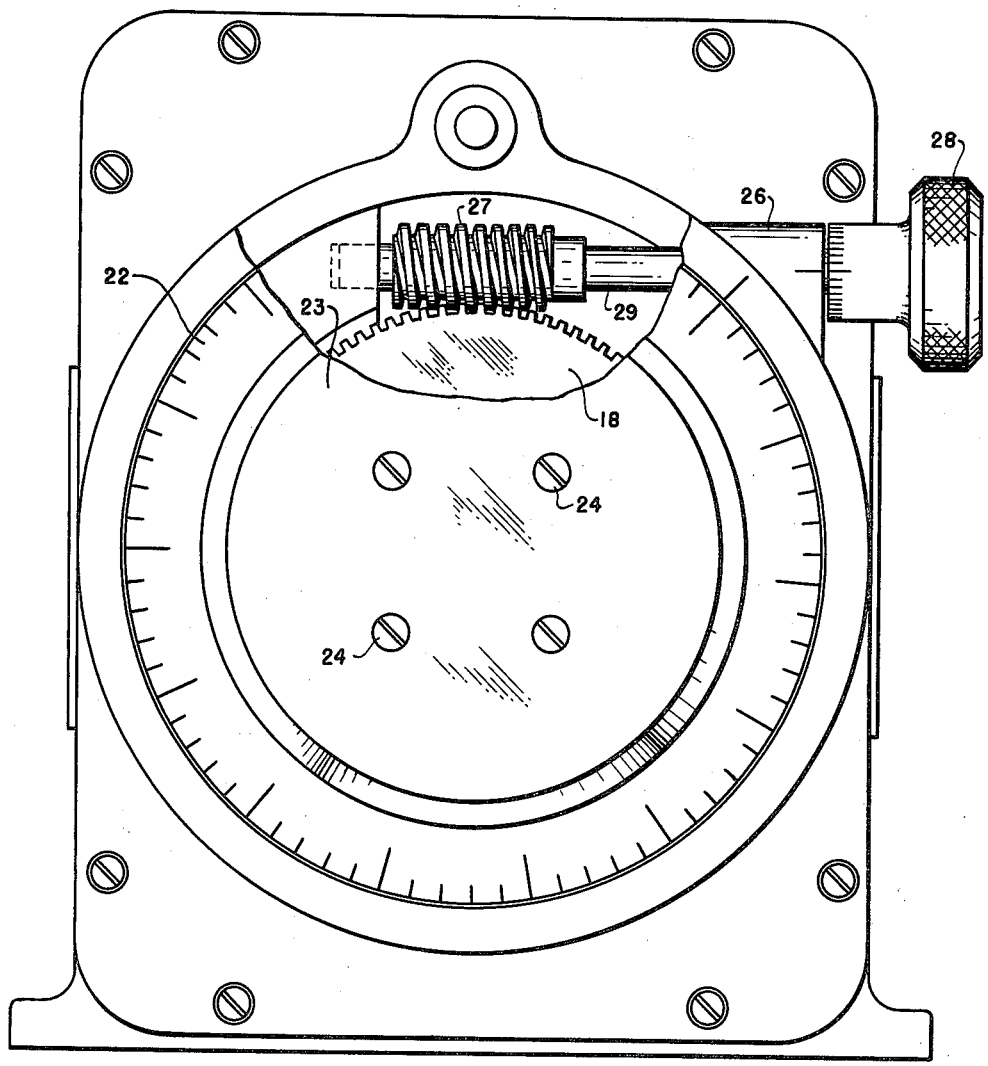
FIG. 2 is a front view of the detector switch with a partial section showing the idal adjusting mechanism.

Collar member 13 is rotatably mounted in end member 21 which serves to complete the enclosure 1. Dial plate 22 is also mounted on the end of collar member 13 adjacent the pinion 18 and is likewise secured for rotation therewith by the screw 20. Finally, a cover plate 23 is secured to the outside of the dial plate by screws 24. End member 21 is formed with a cavity 25 to accommodate worm gear 27 which engages pinion 18 and is mounted in bearing support 26 (FIG. 2) formed integrally with the end member 21. A suitable adjusting knob 28 is secured to the other end of a shaft 29 which forms part of the worm.

It can be seen that by manually rotating externally located knob 28, the worm gear 27 rotates, causing the pinion 18 to rotate. This in turn causes a rotation of collar member 13 and brush yoke 9 and thereby varies the angular position of the brushes 10, 11 and 12 with respect to the control sector 6 of the shaft 5.

Brush yoke 9 has a circumferential slot 30 in its outer periphery near one end. A rectangular frame member 31, shown in FIG. 1 in cross section, is mounted in a plane perpendicular to the central axis of the brush yoke 9 and is so disposed that both vertical members 32 of the frame member are engaged by the slot 30 of the brush yoke. Frame 31 is connected to the front cover member 21 by means of a screw member 33. This screw member includes a shaft 34 rotatably mounted in end cover 21 with its end having a screw driver slot 35 or a like provision for turning the shaft from outside of the housing.

By rotation of the shaft 34, screw member 33 threadedly engaged to the frame member 31 causes the frame member to move toward or away from the dial end of the enclosure. Because it is engaged with the slot 30 in the brush yoke, movement of the frame member causes a similar longitudinal movement of the brush yoke. An indicating pointer 36 is fixedly engaged with a part of frame 31 and protrudes through an opening 36a in housing 1. This opening is marked with a suitable scale, which in conjunction with pointer 36, will show the extent of any adjustment of the position of the frame 31 and brush yoke 9.

One of the most important features of the selector switch lies in its ability to set the cycle of a continuous processing machine by a single adjustment of its dial. To obtain a particular operating cycle of a machine, the appropriate adjustment of the selector switch dial is made, and the detector switch causes a change in the previous setting of the machine so that the machine is adjusted to the point set on the dial.

Figure 3:
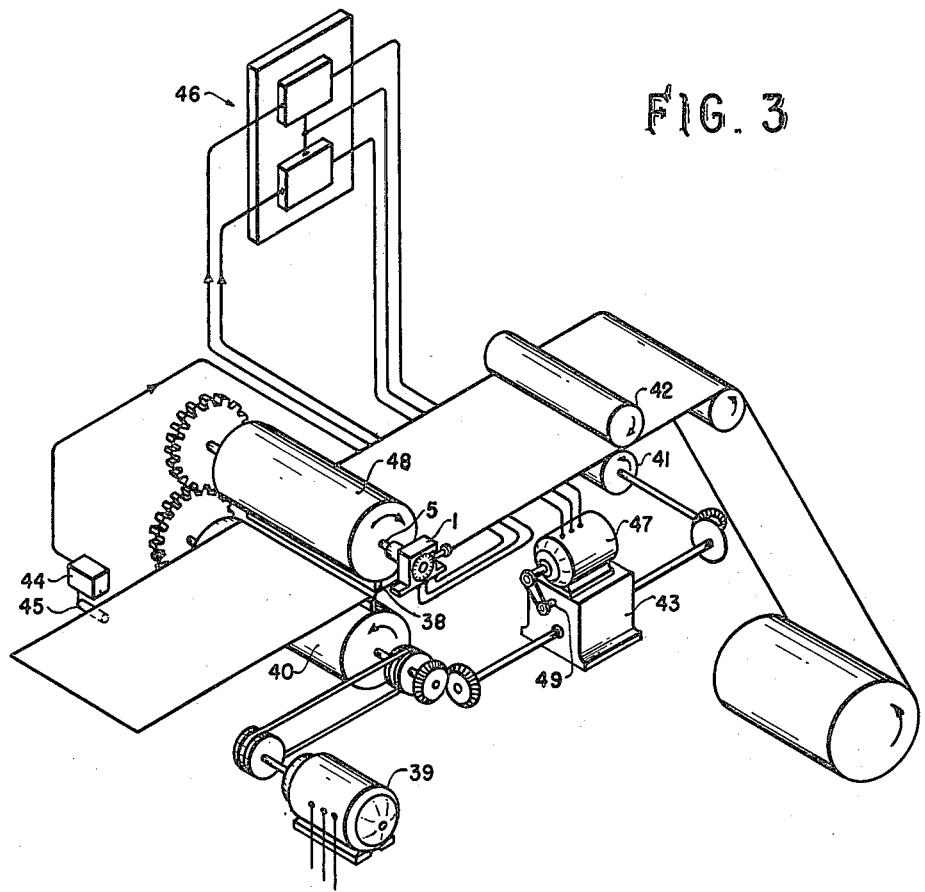
FIG. 3 is an illustration of the detector switch being used in connection with a sheeter or cutting machine.

To describe how this is accomplished and to describe the general function and features of the detector switching apparatus, it will be assumed that it is to be used in conjunction with a sheeter or a rotary cutting machine as illustrated in FIG. 3. The shaft 5 of the selector switch is coupled to the shaft of cutting rotor 48. This coupling is shown as being direct, but this is not essential. The coupling may include one or more intermediate gears, but it is essential that it be positive in the sense that slippage cannot occur. In FIG. 3, shaft 5 of the detector switch is coupled to cutting rotor 48 in a one-to-one ratio, but it is to be understood that other ratios may be used.

Furthermore, shaft 5 is so coupled to the cutting roller 48 that the plane of separation of the conducting and non-conducting portions of the switch rotor 6 angularly coincides with the plane passing through the cutting blade 38 and the axis of cutting rotor 48. When this plane of separation in the control section 6 is vertical, the plane passing through the cutting blade and the axis of the cutting roller is likewise vertical. This, too, is not an essential condition, for as will be seen, all that is necessary is that there be a fixed relationship between the switch rotor and the cutting rotor. The particular condition described here was chosen with a view toward simplifying the explanation of the apparatus.

As further illustrated in FIG. 3, a main drive motor 39 drives cutting roller 40 which is preferably coupled by gears to cutting roller 48. Cutting roller 40 is further interconnected with feed roller 41 through a variable transmission 43. This transmission may be of any type in which the ratio of the speed of the cutting rollers to the speed of the feed rollers 41 and 42 can be varied and adjusted linearly, but not in steps or increments. This unit may be an infinitely variable drive arrangement or it may be a variable pulley arrangement manually or power regulated. In any event, it is a variable speed transmission which, when a particular setting thereof has been effected, a speed ratio obtains which remains effective until such time as the setting thereof is again changed. Stated otherwise, it is a fixedly settable variable speed transmission as distinguished from a differential mechanism which is effective to produce a change in speed ratio only while the change in setting is in effect. Preferably, it is the well-known variable-ratio pulley system which uses a V-belt, and in which shaft 49 is the adjusting shaft which causes the pulleys to inversely vary their diameters.

In the the operation of the cutting machine in conjunction with the selector switch, a photo electric scanner 44 must be mounted at the discharge side of the cutting rollers at some fixed distance from the point at which the cut is made. The scanner is so mounted in relation to a light source 45 that a beam of light will be interrupted by the edge of a sheet of paper that is being discharged from the cutter rollers 40 and 48. For the sake of illustration, it will be assumed that the scanner 44 is located eight inches away from the cutting rollers. In any case, the scanner must be located a distance from the line of severence slightly less than the length of the smallest sheet which can be cut by the mcahine.

It will also be assumed that the length of the sheets to be cut is to be ten inches. Although not essential to the invention, but to simplify the explanation, it will be further assumed that hte shaft 5 of the detector switch is so coupled to the cutting rotor 48, that when the cutting the web, the plane of separation between the insulating and conducting portions of the rotor 6 is vertical.

Since the scanner 44 is eight inches from the point of cut, it is evident that the edge of a sheet about to be a cut will cause a signal to be emitted by the scanner 44 at an instant in which the cutting rotor has completed 8/10 of a complete revolution. Therefore, to set the machine for a ten inch cut, the dial 22 must be adjusted through knob 28 to rotate brush yoke 9 through 8/10 of a complete revolution, from a further assumed starting position in which the axis through brushes 11 and 12 was vertical.

Under this condition of adjustment of the selector switch, assuming that the speed of the feed rollers and the speed of the cutting rollers is precisely synchronized to produce a ten inch cut, the edge of the web emerging from between the cutting rollers and about to be cut, will cause a signal to be emitted by the scanner 44 when the cutter is 8/10 of the way through a complete revolution. This signal passes to both brushes 11 and 12, the brush 10 being grounded. At this time both brushes 11 and 12 will be bridged by the bridging contact 8 so that the signal will pass to the brush 10 and from thence to ground. Brushes 11 and 12 are also connected to an electrical circuit 46, shown as having two balanced sections or sides, one for advance and one for retard, each brush being connected to a separate side thereof, but since both brushes were connected to ground at the instant described, no signal reached either side of the circuit.

This electrical circuit is of a known type, the details of which form no part of the present invention. It may be an electronic circuit including a pair of vacuum tubes such as Thyratrons, for example, on each side of the circuit, the input signal being introduced to the control grid of one of the tubes and the output signal emanating from the plate of the same time tube. Or, the circuit may instead include a suitable relay in each side with the operating coil of the respective relay being actuated by the input signal, and the output of the circuit being controlled by the actuated contacts of the same relay. Details of the construction of circuit 46 are not described since such circuits are well-known, it being essential only that it be of such characteristic that an input signal passing into either of the two sides will produce an output signal from that same side, amplified to whatever extent necessary, and that when the input is grounded, no signal is able to reach that respective side.

For proper operation of this invention it is necessary to insert a circuit element, preferably a high resistance, between each of the brushes 11 and 12 and the scanner 44 to prevent a grounding of signal at one of the brushes from affecting the signal at the other brush.

The outputs of the control circuit may be connected to audible and/or visible signalling devices to indicate to an operator that the ratio of feeding and cutting speeds must be adjusted. They may be connected to cause forward or reverse operation of a correction motor 47 of a variable transmission mechanism 43 as shown in FIG. 3 to readjust the synchronization of feed and cutting speeds automatically.

The photo-electric scanner 44 is so designed as to emit a signal impulse which is initiated by a small spacing between sheets as they leave the cutter, or by some mark or impression which is left on the web as a result of its having been subjected to the work operation. This impulse passes to the detector switch where one or both sides of the control circuit will be grounded, thereby blocking the impulse from the respective one or both sides. If both sides of the control circuit are blocked from receiving the impulse by ground, this results in no output signal from either side of the control circuit and this occurs when the sheet being cut, for instance, is of the correct length. However, if the length of the sheet is too short or too long, the impulse from the scanner will pass to the detector switch when the rotor 6 thereof is in such a position with respect to brushes 11 and 12, that only one of these brushes is connected to the rotor 8 and hence, only one side of the control circuit is blocked. This will cause the other side of the control circuit which receives the impulse to either indicate by signal that correction is needed or cause automatic correction by sending a pulse of fixed increment and polarity to correction motor 47. Correction motor 47 would operate to adjust variable transmission 43 a predetermined amount in one direction. Should this cause a synchronization of feed and cutting speeds, the next impulse from the scanner will be blocked by the detector switch from both sides of control circuit 46. If, however, the change is not great enough, the next cycle will cause a repeated change or adjustment in the same direction. If the change should be too great, the next cycle will indicate a change in the opposite direction, that is, the impulse will be blocked from the opposite side of the control circuit, and the correction motor 47 will operate to adjust variable transmission by a fixed, but smaller, increment in the opposite direction, until a balance or synchronization is finally attained. The variable transmission may be arranged to adjust feed roller speed with respect to cutter roller speed, or vice versa, whichever is most convenient.

If the selector switch is set for a ten inch cut and it should happen that the web should be travelling too fast for the cutting rollers due to variations which occur in any of the components, the synchronization between feed and cutting will be lost and the pieces being cut would be some amount over ten inches in length. The edge of the sheet being cut would cause a signal to be sent by the scanner 44 at an instant of time before which the line of separation between insulating and conducting portions of rotor 6 intersects brushes 11 and 12. In this case, the signal would pass to brushes 11 and 12, one of which would be in contact with bridging contact 8, and the other with insulating portion 7. The signal would be grounded at bridging contact 8, hence, the signal at the opposite brush unblocked into one side of the balanced two-sided circuit 46, which would then cause a visual or audible signal to be given, and/or cause signal correction motor 47 to appropriately adjust variable transmission 43.

Likewise if the synchronization is off so that the cutting speed is too fast with relation to the feed speed, the sheets being cut would be some amount under ten inches, and the cut end of each successive sheet would cause the scanner 44 to send a signal at an instant of time after the line of separation between insulating and conducting portions of the rotor 6 had already gone by the two brushes 11 and 12. In this case, the opposite side of control circuit 46 would operate to signal that a change in the opposite direction from that indicated before was needed, or it would cause operation of the correction motor 47 in the opposite direction to that previously described, to adjust variable transmission 43 to bring the two speeds back into synchronization.

From this, it can be seen that when a machine using the selector switch is to be set for a new run or operation, all that needs to be done is to make an appropriate adjustment of the dial 22 of the detector switch. It is not necessary to change the location of the scanner 44 or to make any further adjustments. If, for instance, a sheet of twenty four inch length is to be cut on the machine, and the scanner is located eight inches from the point of cut, the knob 28 would have to be rotated until the brush yoke 9 assumed such angular position that the axis through brushes 11 and 12 fell at a position which constituted 8/24 or 1/3 of a complete revolution of cutting roller 48. In degrees this would necessitate an angular displacement of the brush yoke 9 of 120 degrees from normal position.

The dial 22 may be marked with suitable calibrations to indicate length of cut obtained for any angular position of the dial, assuming the position of the scanner to be fixed.

In setting up a continuous process machine for a new operation, all that is normally required is for the operator to manually adjust the dial to the desired setting for a given desired length of cut and start the machine into operation. Stopping the machine and checking measurements and making subsequent trial adjustments are all unnecessary.

When the detector switch is used in conjunction with automatic adjustment equipment as shown in FIG. 3 the detector switch is capable of holding the spacing between operations on a web to very precise tolerances. Each time an error is noted, the detector will signal for a correction.

In some operations, it may be desirable to obtain various degrees of accuracy or trueness of dimension of the spacing of operation, or in the case of a cutter, in the size of the sheets cut. In some cases it may be necessary to hold the size to close tolerances. In other instances where accuracy is not required, it would be objectionable to have the apparatus continually correcting itself for insignificant errors. Hence, a feature of adjustable accuracy is incorporated into the selector switch. As was mentioned earlier, the plane of separation between the conducting and non-conducting portions of rotor 6 is not parallel to the longitudinal axis of the shaft. Furthermore, by means of frame assembly 32, the brush yoke 9 is movable longitudinally with respect to the rotor 6. From the illustration in FIG. 1, if the brush yoke 9 is drawn to the right, a greater degree of accuracy will be obtained, because the amount of conducting area that can be under brushes 11 and 12 simultaneously, is diminished. This means that both brushes will be grounded simultaneously and hence, the signal will be blocked from both sides of the control circuit for a shorter time or for fewer degrees of rotation of the control section.

Likewise by causing the brush yoke 9 to be moved to the left as shown in FIG. 1, the amount of conducting surface which is able to be under both brushes 11 and 12 simultaneously is increased. This adjustment will result in less precision, because the signal from the scanner will be blocked from both sides of the control circuit simultaneously for a longer time or for a greater number of degrees of rotation of the rotor 6. The angular span during which no correction is indicated is increased as is the related linear span on the web being processed in the machine.

The adjustment of the longitudinal position of the brush yoke 9 is accomplished through rotation of the previously described screw member 34, and can be measured by the movement of pointer 36 in conjunction with its related scale in opening 36a.

Figure 4:
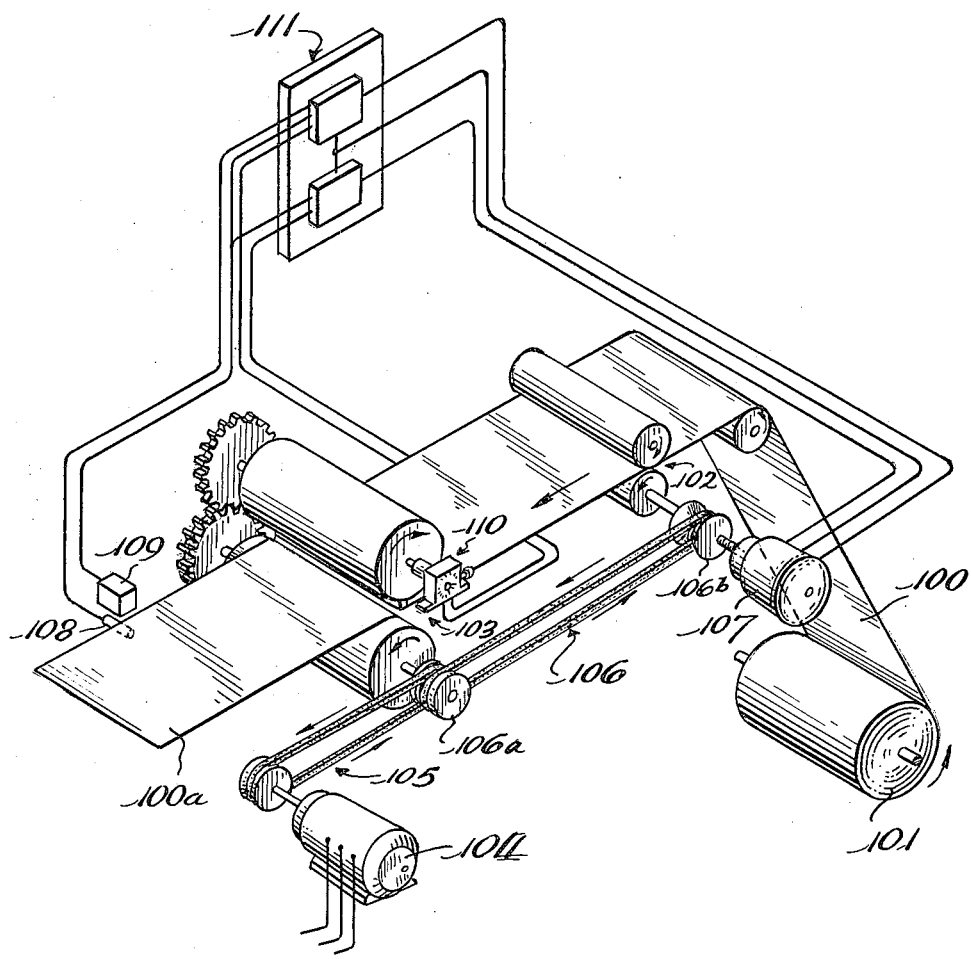
FIG. 4 is a view similar to FIG. 3 of a modified control arrangement.

In FIG. 4 a modified form of the invention is illustrated in which a web 100 from supply roll 101 is delivered through driven feed rolls 102 to a rotary cutter 103 which severs the web into sections 100a of predetermined length. Cutter 103 is driven by motor 104 through the belt and pulley arrangement 105. A second drive arrangement 106 is coupled with cutter 103 for operating feed rolls 102 and includes a pair of split sheaves 106a and 106b. The spacing between the elements of sheave 106b is varied by a control motor 107, which thus varies the speed at which the speed rolls are driven relative to the speed of rotary cutter 103.

A sensing arrangement is provided in the form of a lamp 108 and photocell 109 located beyond the rotary cutter 103, i.e. in a position at which it senses the leading edge of the web after it has passed through the cutter. In effect, the sensing apparatus detects the point at which a previous cut has been made in the web. The selector or control switch 110 is mechanically coupled with rotary cutter 103. The photocell 109 and control switch 110 are electrically connected with control circuits 111 which in turn energize control motor 107 to vary the speed of feed rolls 102 relative to that of rotary cutter 103 in a manner to maintain the length of web sections 100a constant at a predetermined value. If the web section 100a is too short, i.e. if the leading edge of the web section reaches photocell 109 too late relative to the angular position of cutter 103, control motor 107 is operated in a manner separating the sections of split sheave 106b reducing its effective diameter and increasing the speed of feed rolls 102. Conversely, if the leading edge of the web section reaches photocell 109 too soon control motor 107 moves the sections of sheave 106b together decreasing the speed of the feed rolls 102 relative to the speed of the rotary cutter.

Figure 5:
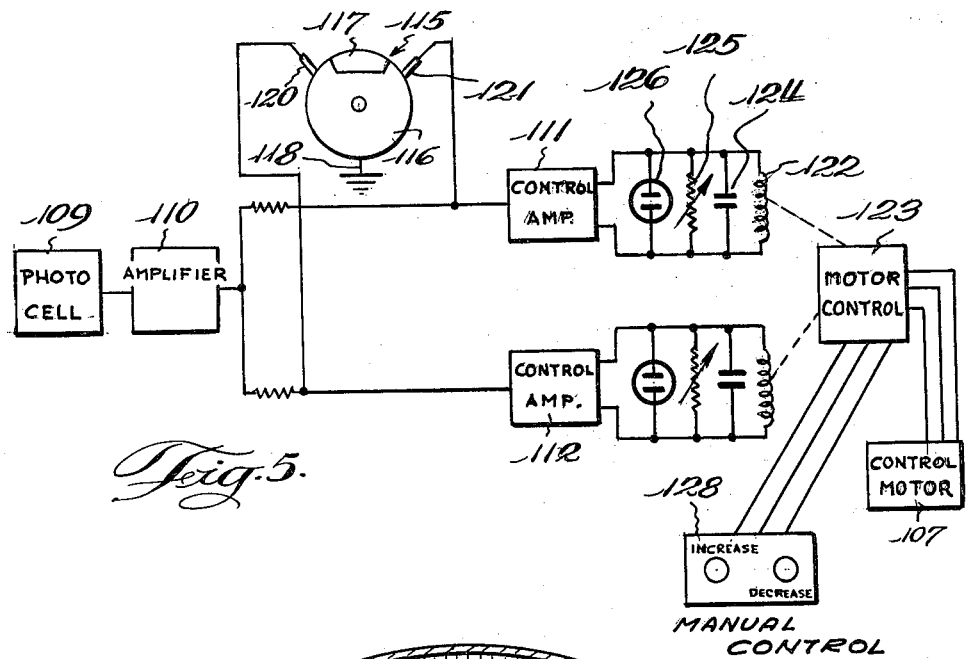
FIG. 5 is a block diagram of a control circuit embodying the invention.

In the block diagram of the control circuit, FIGURE 5, the signal from photocell 109 is coupled through an amplifier 110 to a pair of control amplifiers 111 and 112 one of which when actuated causes control motor 107 to increase the feed roll drive speed and the other of which causes a decrease. Connected in shunt with the inputs of the control amplifiers 111 and 112 is a modified and improved form of selector switch 115.

The switch 115 includes a rotatable disc 116 of conductive material, with an insert 117 of insulating material. A connection 118 is made from the disc 116 to a reference potential or ground. A pair of brushes 120 and 121 are associated with the disc and are connected with the inputs of the control amplifiers 111 and 112. As disc 116 rotates with rotary cutter 103, brushes 120 and 121 are alternately grounded through the main disc body 116 preventing actuation of the associated control amplifiers. At a certain angular position of disc 116 both brushes 120 and 121 are connected to ground while at other positions one or the other of the brushes contact the insulating insert 117.

If the signal from photocell 109 occurs when both connectors are returned to ground through the control switch, no signal is coupled to control amplifiers 111 and 112. In this situation the cutting system is operating properly and the length of severed web sections 100a is correct. With a variation in the relationship of the leading edge of web 100 and the position of rotary cutter 103 from the desired condition, the signal from photocell 109 occurs at a point in time relative to the angular position of disc 116 where one or the other of the brushes engages the insulating insert 117 and the photocell signal triggers the associated control amplifier. The output circuits associated with each of the control amplifiers are identical and only one will be described. Control amplifier 111 has connected therewith the operating coil 122 of a control relay which has contacts associated with motor control 123 which in turn actuates control motor 107. Connected in shunt with relay coil 122 is capacitor 124 which charges when the relay is energized and then discharges through the relay coil keeping the relay energized for the period of time sufficient to operate control motor 107 to effect a desired speed change. Variable resistor 125 shunts capacitor 124 and may be adjusted to vary the amount of speed change with each actuation of the control amplifier. Also connected in shunt with relay coil 122 is a suitable indicator 126, here shown as a neon bulb, which provides for further indication of the correction being effected. A bell or other audible signal may be added to or substituted for the visual indication provided by neon bulb 126. A manual motor control 128 permits an operator to actuate motor control 123 to increase or decrease the speed of the drive to the feed rollers. The manual control may advantageously be used by an operator while observing the indications from neon bulb 126, which indicate whether the system is cutting sections of the web long or short.

The system disclosed provides an absolute and accurate control over the length of the spacing of repeated operations on a web regardless of the cause of possible error. For example if the thickness of the web changes, the effective diameter of the feed rolls and the rate of movement of the web change. This change is immediately detected and the speed of the feed rolls altered to compensate for it.

Figure 6:
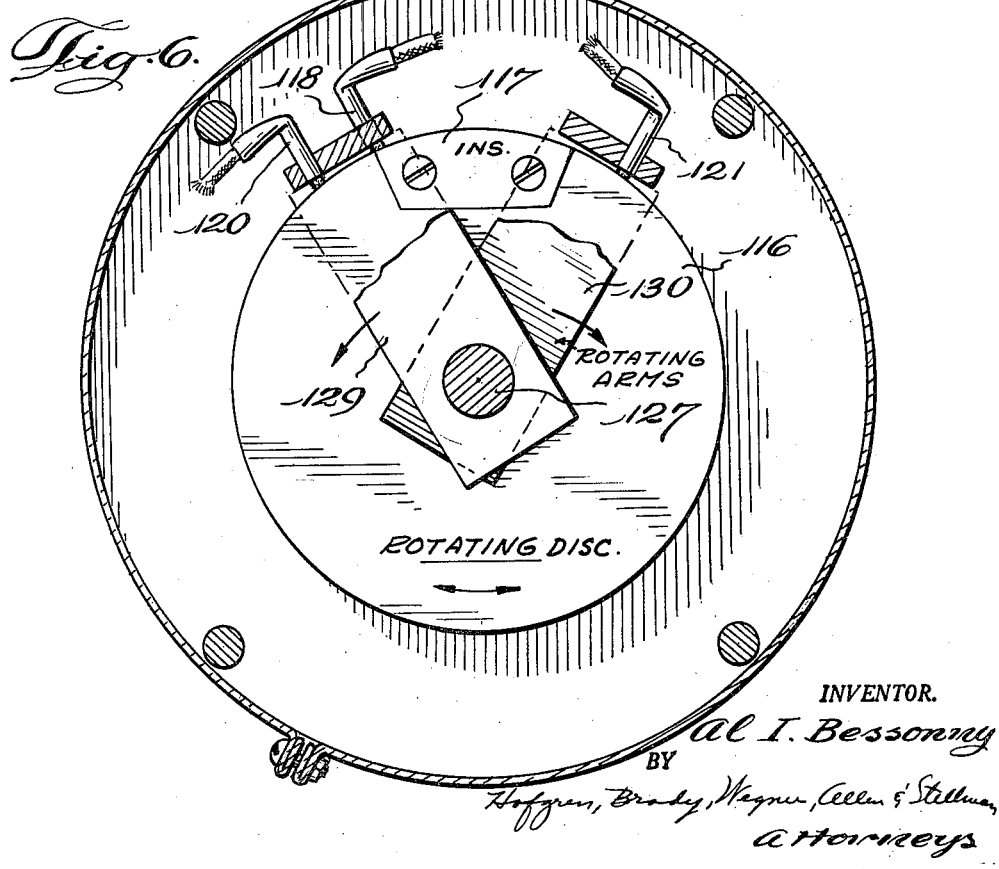
FIG. 6 is a side elevational view, partly in section, of a modified detector switch.

FIGURE 6 illustrates in somewhat more detail the physical arrangement of rotary selector switch 115. Conductive rotating disc 116 is mounted on shaft 127 which is driven directly from the rotary cutter. Inset in a portion of the peripheral surface of the disc is insulating element 117, which extends through only a portion of the thickness of the disc and the lines of separation between the insulating surface and the disc on the periphery of the disc are located in planes which pass through the axis of rotation of the disc. A pair of arms 129 and 130 carry the control connection brushes 120 and 121 in a position on the surface of the disc so that they alternately contact the conductive surface of the disc and the insulating surface of insert 117. A third brush 118 is carried by arm 129 and is displaced axially from brush 120 contacting the conductive disc surface at all times providing the ground connection.

Arms 129 and 130 are angularly shiftable about disc 116 to change the point at which control operation is effected relative to the angular position of the disc, thus changing the length of web section 100a which is severed. For this control both connectors 120 and 121 are movable together and their position may be indicated on a suitably calibrated dial (not shown).

A further adjustment is provided over the sensitivity of the system, or the accuracy with which the length of severed web section is controlled. This adjustment is made by moving the two arms 129 and 130 relative to each other to move the control brushes 120 and 121 toward or away from each other; and preferably in such a manner that both arms are moved an equal amount with respect to the line bisecting the angle formed by the arms. Thus the absolute length calibration of the control apparatus is not effected. The sensitivity may be varied over a continuous range, and maximum sensitivity is limited only by the contact time of the connectors. The relative spacing between the arms or the accuracy with which the apparatus will control the severed web length, may also be indicated on a suitable dial (not shown).

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. Apparatus for successively severing sheets of predetermined length from a continuously moving web of sheet stock, said apparatus comprising means establishing a linear path of travel for forward movement of the web and the severed sheets through the apparatus, means establishing a web feeding station, a web severing station and a web sensing station at spaced regions along said path consecutively forwardly of the path and in the order named, a pair of feed rolls at the feeding station for feeding the web forwardly through the severing station to the sensing station, a rotary cutter at the severing station for successively severing sheets from the web passing through the severing station at a fixed cut-off point and in a predetermined angular cutting position, a scanning device at the sensing station positioned for operative register at a fixed sensing point with the leading edge of the unsevered web emanating from said severing station and operable in response to such register to emit an electrical impulse, an electric motor for driving said cutter and feed rolls, a fixedly settable variable speed transmission interposed between the cutter and feed rolls whereby the relative speed at which the cutter and feed rolls are driven may be varied according to the setting of the variable speed transmission, means operatively connecting said variable speed device and motor in driving relationship, a pair of normally deenergized work circuits adapted to become energized under the influence of impulses received from said scanning device, a rotary selector switch including a pair of circumferentially spaced brushes, one for each work circuit, and a rotary bridging contact operatively connected to the cutter in driving relationship, said bridging contact being operable when in engagement with one of said brushes to disable one of the work circuits and when in engagement with the other of said brushes to disable the other work circuit, means allowing for circumferential adjustment of said brushes in unison, said means including an angularly adjustable brush holder constraining said brushes to move in unison, said bridging contact being engageable with both of said brushes when the leading edge of the unsevered web is in register with the scanning device and the cutter is in advance of its angular cutting position by a predetermined amount, said bridging contact being engageable with one of said brushes to the exclusion of the other when the leading edge of the unsevered web is in register with the scanning device and the cutter is in advance of its angular cutting position by an amount less than said predetermined amount, said bridging contact being engageable with the other of said brushes to the exclusion of the one when the leading edge of the unsevered web is in register with the scanning device and the cutter is in advance of its angular cutting position by an amount greater than said predetermined amount, a reversible electric motor for controlling the speed ratio of said variable speed transmission and operatively connected to said work circuits and to said variable speed transmission, said reversible motor being operable upon energization of one of said work circuits to change the setting of said variable speed transmission and increase the speed ratio between the cutter and feed rolls and operable upon energization of the other work circuit to change the setting of the variable speed transmission and decrease the speed ratio between the cutter and feed rolls, and manually operable means for shifting the angular position of said brush holder to advance or retard the engagement of said brushes with said bridging contact.

2. Apparatus as set forth in claim 1 and including, additionally, a dial indicator including relatively movable pointer and scale elements, and means operatively connecting one of said elements to the brush holder for movement in unison therewith to enable the brush holder to be shifted to a predetermined angular position by said manually operable shifting means by reference to the dial indicator to the end that when the pointer and scale elements assume a predetermined relationship sheets of predetermined length will be severed from the moving web.

References Cited in the file of this patent

UNITED STATES PATENTS

| | | |
|---|---|---|
| 129,085 | Barjon | July 16, 1872 |
| 913,753 | Murray | Mar. 2, 1909 |
| 1,913,153 | De Salardi | June 6, 1933 |
| 2,002,374 | King | May 21, 1935 |
| 2,050,316 | Gulliksen | Aug. 11, 1936 |
| 2,080,575 | Perry | May 18, 1937 |
| 2,245,442 | Morgan | June 10, 1941 |
| 2,249,820 | Gulliksen | July 22, 1941 |
| 2,415,428 | Iversen | Feb. 11, 1947 |
| 2,429,500 | Wolfner | Oct. 21, 1947 |
| 2,520,709 | Bitler | Aug. 29, 1950 |
| 2,599,430 | Beuerman | June 3, 1952 |
| 2,622,681 | Durst | Dec. 23, 1952 |
| 2,673,947 | Winther | Mar. 30, 1954 |
| 2,742,246 | Mellen | Apr. 17, 1956 |
| 2,858,885 | Loeb | Nov. 4, 1958 |
| 3,058,869 | Cohen et al. | Oct. 6, 1962 |

FOREIGN PATENTS

| | | |
|---|---|---|
| 371,618 | Germany | Mar. 17, 1923 |